United States Patent
Wang et al.

(10) Patent No.: US 10,107,264 B2
(45) Date of Patent: Oct. 23, 2018

(54) MEDIUM VOLTAGE WIND POWER GENERATION SYSTEM AND POWER GENERATION METHOD USING THE SAME

(71) Applicant: Delta Electronics (Shanghai) Co.,Ltd., Shanghai (CN)

(72) Inventors: Changyong Wang, Shanghai (CN); Fei Lu, Shanghai (CN)

(73) Assignee: DELTA ELECTRONICS (SHANGHAI) CO.,LTD., Shanghai (CN)

( * ) Notice: Subject to any disclaimer, the term of this patent is extended or adjusted under 35 U.S.C. 154(b) by 0 days.

(21) Appl. No.: 15/587,417

(22) Filed: May 5, 2017

(65) Prior Publication Data

US 2018/0038348 A1    Feb. 8, 2018

(30) Foreign Application Priority Data

Aug. 2, 2016  (CN) .......................... 2016 1 0625604

(51) Int. Cl.
| | |
|---|---|
| *F03D 9/00* | (2016.01) |
| *H02P 9/04* | (2006.01) |
| *F03D 9/25* | (2016.01) |
| *H02K 7/18* | (2006.01) |
| *H02P 9/00* | (2006.01) |
| *H02J 3/38* | (2006.01) |
| *H02P 101/15* | (2016.01) |

(52) U.S. Cl.
CPC .............. *F03D 9/255* (2017.02); *H02J 3/386* (2013.01); *H02K 7/183* (2013.01); *H02P 9/007* (2013.01); *H02P 2101/15* (2015.01)

(58) Field of Classification Search
CPC .......... F03D 9/255; H02J 3/386; H02K 7/183; H02P 9/007
See application file for complete search history.

(56) References Cited

U.S. PATENT DOCUMENTS

| | | | | |
|---|---|---|---|---|
| 8,174,138 | B2* | 5/2012 | Castelli Dezza | H02M 7/25 290/42 |
| 8,432,055 | B2* | 4/2013 | Grbovic | H02P 3/18 290/44 |
| 8,823,190 | B2* | 9/2014 | Wang | H02P 9/007 290/44 |
| 2002/0079706 | A1* | 6/2002 | Rebsdorf | H02P 9/007 290/55 |
| 2005/0151520 | A1* | 7/2005 | Schreiber | H02M 7/19 323/247 |

(Continued)

Primary Examiner — Tulsidas C Patel
Assistant Examiner — Thomas Quigley
(74) Attorney, Agent, or Firm — CKC & Partners Co., Ltd.

(57) ABSTRACT

A medium voltage wind power generation system comprises a first boost device and a wind power generation device; the first boost device has a medium voltage side and a high voltage side, and the high voltage side of the first boost device is electrically connected to a grid; the wind power generation device comprises wind generators, rotor side converters and line side converters; the wind generators comprise stator windings and rotor windings; the stator windings are coupled to the medium voltage side of the first boost device; the rotor side converters are coupled to the rotor windings; one end of the line side converters are coupled to the rotor side converters, and the other end thereof is coupled to the medium voltage side of the first boost device via a second boost device.

10 Claims, 4 Drawing Sheets

(56) References Cited

U.S. PATENT DOCUMENTS

| | | | |
|---|---|---|---|
| 2006/0192390 A1* | 8/2006 | Juanarena Saragueta | ................... H02P 6/005 290/44 |
| 2013/0200714 A1* | 8/2013 | Pan | ........................ H02J 3/386 307/82 |
| 2014/0091630 A1* | 4/2014 | Kim | ........................ H02J 3/36 307/82 |
| 2015/0349687 A1* | 12/2015 | Liang | ........................ H02J 3/38 322/61 |
| 2016/0079898 A1* | 3/2016 | Liang | ........................ H02P 9/007 322/61 |

* cited by examiner

MEDIUM VOLTAGE WIND POWER GENERATION SYSTEM AND POWER GENERATION METHOD USING THE SAME

CROSS-REFERENCE TO RELATED APPLICATIONS

This non-provisional application claims priority under 35 U.S.C. § 119(a) on Patent Application No. 201610625604.4 filed in P.R. China on Aug. 2, 2016, the entire contents of which are hereby incorporated by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

TECHNICAL FIELD

The present invention relates to an electric power technology, and particularly to a wind power generation system and a power generation method using the same.

BACKGROUND ART

Doubly-fed variable speed constant frequency generator sets are one kind of wind generator sets that have the highest market share at present, and the pitch angles of the wind wheels thereof can be adjusted. Generators can operate at a variable speed and output electric energy with constant frequency and constant voltage, and the speed adjustment range thereof reaches ±30% of synchronous speed. A converter is an important component of a wind power generation device, and an AC-DC-AC converter with a back to back structure is generally used, wherein the part connected to a grid is called a line side converter (LSC), and the part connected to a rotor is called a rotor side converter (RSC). The magnitude and frequency of excitation field of rotors are changed by controlling the magnitude and frequency of exciting current of the rotors through the RSC, which make the output voltage and frequency of the generator keep pace with those of the grid. Thus, the wind power generation device operates at a variable speed and a constant frequency.

The power outputted by the doubly-fed power generation system to the grid consists of two parts, i.e., the power directly outputted from the stator and the power generated from the rotors through a converter. Converters only provide part of the power of the entire power generation system, and the ratio of the power outputted from the stator to the power generated through a converter varies as the rotate speed of the generator varies.

Among doubly-fed power generation systems whose capacity is less than 3MW, the voltage at stator side of a generator is 690 Vac, and the generator is connected with a low voltage transformer. The voltage at rotor side of the generator varies in a range between 0 and 690V according to the rotate speed of the generator. The rated AC voltage of the converter is 690V, and the DC bus voltage is generally 1100V.

Please refer to FIG. 1, which is a schematic view showing the structure of a doubly-fed wind power generation system in the prior art. As shown in FIG. 1, the current wind power generation and transmission system generally has a three-stage structure:

A doubly-fed wind power generation device 1a is as the first-stage structure, and includes doubly-fed generators 11a, converters 12a, fan blades 13a and gears. The doubly-fed wind power generation device 1a is mounted in a wind turbine tower to convert wind energy into electrical energy.

A first booster system 2a is as the second-stage structure, and boosts the low voltage alternating current (e.g. 0.69 kV) converted by the generators to medium voltage alternating current (e.g. 10 kV, 20 kV or 35 kV, etc.) through boosting transformers 21a. The capacity of the boosting transformer 21a is the same as that of the doubly-fed generator 11a. That is, the capacity of the first booster system 2a is the same as that of the doubly-fed wind power generation device 1a. The first booster system 2a is generally mounted in the vicinity of the tower.

A second booster system 3a is as the third-stage structure, and boosts the medium voltage alternating current to high voltage alternating current (e.g. 110 kV or 220 kV, etc.) through a transformer 31a. And the high voltage alternating current can be used for long-distance power transmission. The doubly-fed wind power generation device 1a contains plurality of generators connected in parallel and each of the plurality generators connects with a boosting transformer 21a of the first booster system 2a, which form a wind power plant. And the wind power plant is connected to transmission and distribution lines via the common third-stage booster station.

The electric energy outputted by the doubly-fed generators 11a varies with the wind speed, and the converters 12a modulate the electric energy into alternating current with constant frequency and constant voltage. The boosting transformers 21a are mounted within a box transformer substation outside the tower. The boosting transformers 21a boost the low voltage alternating current of the doubly-fed wind power generation device and output the boosted alternating current at the medium voltage sides of the boosting transformers 21a. Then the medium voltage alternating current is converted into high voltage alternating current through the boosting transformer 31a, and the high voltage alternating current is inputted to the high voltage grid via the high voltage side of the boosting transformer 31a. The low voltage is 690V, the medium voltage is generally 10KV, 20KV or 35KV, and the high voltage is 110KV or 220KV. The point between the second booster system 3a and the first booster system 2a is called a medium voltage point. At the medium voltage point, generator sets can be connected in parallel to increase the generating capacity of the system.

In the existing doubly-fed wind power generation system, the alternating current outputted from a doubly-fed power generation device goes through two-stage booster systems, so the transmission efficiency is low and extra electric power will be lost. As the capacity of a single generator becomes higher and higher (e.g. a 3-6MW), the capacity and volume of the converter become larger accordingly. However, the diameter of the tower bottom, that is, the space where the converter is mounted, does not increase as the power multiplies. It is more and more difficult to design and mount the converter. With the increase in power, the current increases in proportion, and the number and capacity of the transmission cables needed increase in proportion, resulting increased construction costs of the existing doubly-fed wind power generation system.

Therefore, there is an urgent need to develop a wind power generation system which can overcome the above deficiencies.

DISCLOSURE OF THE INVENTION

The technical problem to be solved by the present invention is to provide a medium voltage wind power generation system, comprising:

a first boost device, which has a medium voltage side and a high voltage side, the high voltage side of the first boost device being electrically connected to a grid; and a doubly-fed wind power generation device, wherein the doubly-fed wind power generation device comprising:

at least one wind generator, which comprises stator windings and rotor windings, the stator windings being coupled to the medium voltage side of the first boost device;

at least one rotor side converter, which is coupled to the rotor windings; and at least one line side converter, one end of which is coupled to the rotor side converter, and the other end of which is coupled to the medium voltage side of the first boost device via a second boost device.

In the above-mentioned medium voltage wind power generation system, the doubly-fed wind power generation device comprises:

a plurality of wind generators, the stator windings of which are electrically connected to the medium voltage side of the first boost device;

a plurality of rotor side converters, correspondingly electrically connected to the rotor windings of the plurality of wind generators; and at least one line side converter, each of which is electrically connected to at least one rotor side converter.

In the above-mentioned medium voltage wind power generation system, the doubly-fed wind power generation device comprises:

a plurality of line side converters, each of which is correspondingly electrically connected to two rotor side converters.

In the above-mentioned medium voltage wind power generation system, the second boost device has a low voltage side and a medium voltage side, the low voltage side of the second boost device is electrically connected to the line side converter, and the medium voltage side of the second boost device is electrically connected to the medium voltage side of the first boost device.

In the above-mentioned medium voltage wind power generation system, a path for connecting the stator windings and the medium voltage side of the first boost device is provided with a first switch and a second switch, and the operating modes of wind generator are adjusted by switching the first switch and the second switch.

In the above-mentioned medium voltage wind power generation system, the doubly-fed wind power generation device further comprises an energy storage element and a bi-directional DC/DC charger, and the energy storage element is electrically connected between the line side converter and the rotor side converter via the bi-directional DC/DC charger.

In the above-mentioned medium voltage wind power generation system, the doubly-fed wind power generation device further comprises a chopper unit, which is electrically connected between the line side converter and the rotor side converter.

The present invention further provides a medium voltage wind power generation method comprising:

step 1: outputting medium voltage alternating current to the medium voltage side of a first boost device through a doubly-fed wind power generation device; and step 2: converting the medium voltage alternating current into high voltage alternating current through the first boost device and outputting the high voltage alternating current to a grid via the high voltage side of the first boost device.

As for the above-mentioned medium voltage wind power generation method, said step 1 further comprises step 11: outputting stator medium voltage alternating current through stator windings of wind generators of the doubly-fed wind power generation device, and rotor windings of the wind generators generating low voltage alternating current through converters.

As for the above-mentioned medium voltage wind power generation method, said step 1 further comprises step 12: converting the low voltage alternating current generated by the converters into rotor medium voltage alternating current through a second boost device of the doubly-fed wind power generation device.

The medium voltage wind power generation system according to the present invention, which uses low-voltage power devices and boosting transformers of small capacity, can achieve the application of a medium voltage power generation system, increase the electric power transmission efficiency of the system, and reduce the cost and volume of the system. The line side converters and rotor side converters among the converters are of the same capacity, thereby facilitating the modular design and the arrangement of installations. Stator windings output the medium voltage alternating current to boosting transformers, thereby saving the cost of transmission cables and reducing the loss caused during power transmission.

EMBODIMENTS

As regards the details and technical description of the present invention, a preferred embodiment is provided for further illustration, but should not be construed as limiting the implementation of the present invention.

In the embodiments and claims of the present invention, any description relating to "connected" or "coupled" may generally mean that a component is indirectly connected to another one via other components, or a component is directly connected to another one without the use of other components.

Figure 2:
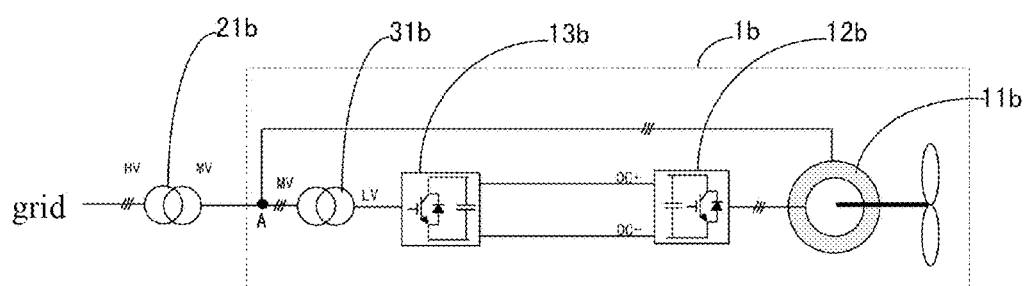
FIG. 2 is a schematic view showing the structure of the medium voltage wind power generation system according to the first embodiment of the present invention.

Please refer to FIG. 2, which is a schematic view showing the structure of the medium voltage wind power generation system according to the first embodiment of the present invention. As shown in FIG. 2, the medium voltage wind power generation system of the present invention comprises a doubly-fed wind power generation device 1b and a first boost device 21b. The first boost device 21b has a medium voltage side MV and a high voltage side HV, and the high voltage side HV of the first boost device 21b is electrically connected to a grid.

Further, the doubly-fed wind power generation device 1b comprises a wind generator 11b, a rotor side converter 12b, a line side converter 13b and a second boost device 31b. The wind generator 11b comprises a stator winding and rotor windings. The stator winding is coupled to the medium voltage side MV of the first boost device 21b. The rotor side converter 12b is coupled to the rotor windings. One end of the line side converter 13b is coupled to the rotor side converter 12b, and the other end thereof is coupled to the medium voltage side MV of the first boost device 21b via a second boost device 31b. The stator winding outputs stator medium voltage alternating current to the medium voltage side MV of the first boost device 21b. The rotor windings generate low voltage alternating current through a converter, which comprises a rotor side converter 12b and a line side converter 13b that are electrically connected in sequence. The second boost device 31b is connected to the medium voltage side MV of the first boost device 21b, and converts low voltage alternating current into rotor medium voltage alternating current. The first boost device 21b converts the medium voltage alternating current generated by the doubly-fed wind power generation device 1b into high voltage alternating current, and outputs the high voltage alternating current to the grid via the high voltage side HV of the first boost device 21b.

The medium voltage wind power generation system as shown in FIG. 2 is mainly of a two-stage structure. The wind power generation device is as the first-stage structure, and the booster system is as the second-stage structure. In the wind power generation device, one end of the line side converter 13b is connected to the DC bus (DC+ and DC−) and the other end is connected to the second boost device 31b. The stator winding and the medium voltage side of the second boost device 31b are connected to the common medium voltage point A. In the booster system, the medium voltage alternating current outputted from the doubly-fed wind power generation device is converted into high voltage alternating current through the first boost device 21b. In this embodiment, the voltage at the stator side is medium voltage (such as 10KV, 20KV or 35KV), and the voltage at the rotor side varies in a range between 0 and 690V according to the rotate speed of the wind generator. The rated AC voltage of the rotor side converter and the line side converter is 690V. The voltage of the DC bus is 1100V. Compared with a low voltage wind power generation system, the low voltage converter is not changed. But the medium voltage wind power generation system in this embodiment uses medium voltage cables for transmitting stator medium voltage alternating current, thereby greatly saving the cost of cables used in the wind power generation system and increasing the electric power transmission efficiency.

Figure 1:
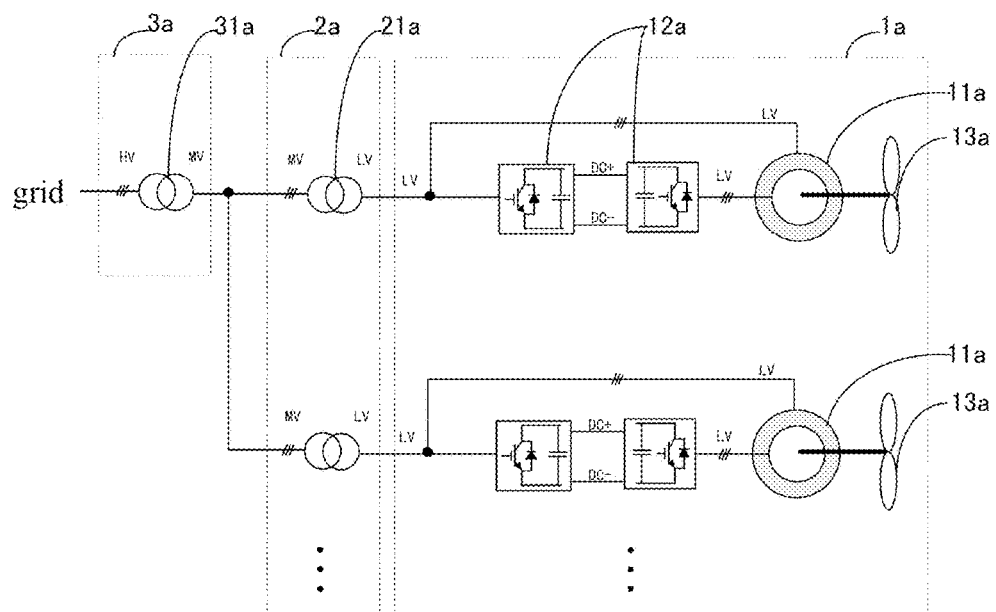
FIG. 1 is a schematic view showing the structure of a doubly-fed wind power generation system in the prior art.

In the low voltage wind power generation system as shown in FIG. 1, a booster system 2a needs to be additionally provided, and the low voltage alternating current generated by the stator and the rotor is boosted by a boosting transformer (e.g. 21a). However, in the medium voltage wind power generation system of the present invention, the second boost device 31b is only disposed at the line side converter to boost the voltage outputted by the line side converter 13b. Generally, at the rated speed, the slip power generated by the rotor windings through the converter is only ⅙ of the power of the wind power generation system. So the power of the transformer 31b connected with the line side converter is only ⅙ of the power of the transformer 21a in the conventional structure. That is to say, the volume, weight and cost of the transformer 31b, which only needs to deal with the power generated by the rotor, are far less than those of the transformer 21a in the booster system 2a. The medium voltage wind power generation system of the present invention has a two-stage structure rather than the traditional three-stage structure, so it has higher energy transmission and conversion efficiency, reduces energy consumption and system costs.

Figure 3:
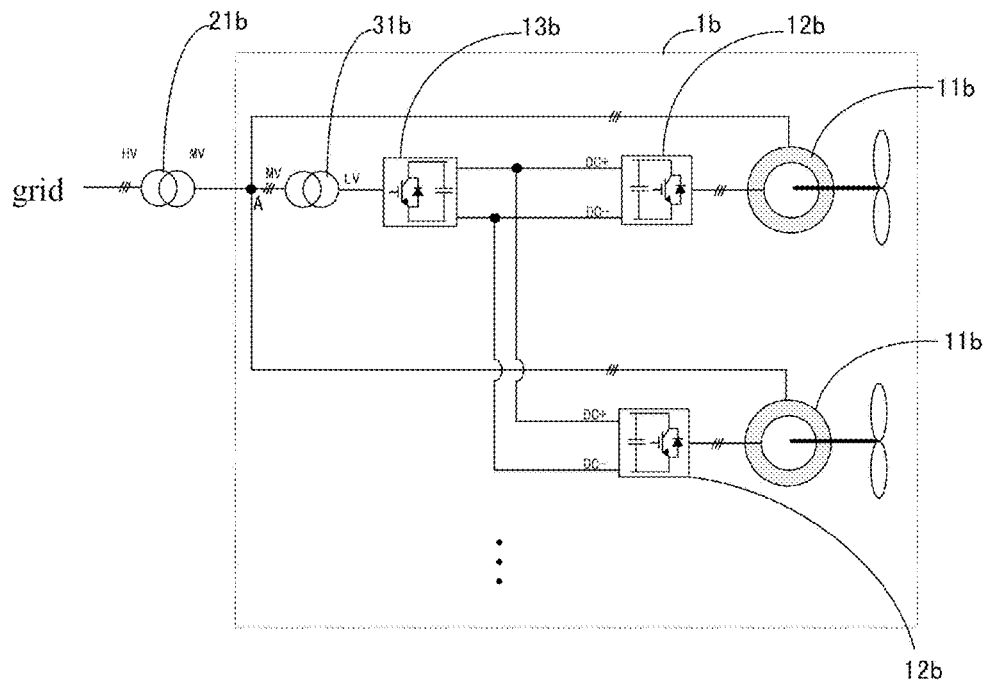
FIG. 3 is a schematic view showing the structure of the medium voltage wind power generation system according to the second embodiment of the present invention.

Refer to FIG. 3, which is a schematic view showing the structure of the medium voltage wind power generation system according to the second embodiment of the present invention. The medium voltage wind power generation system shown in FIG. 3 and that shown in FIG. 2 follow the same principle, so the things that FIG. 2 shares in common with FIG. 3 will not be repeated here, and the differences between them will be descried hereinafter. The doubly-fed wind power generation device 1b of the medium voltage wind power generation system shown in FIG. 3 comprises a plurality of wind generators 11b, a plurality of rotor side converters 12b, and a plurality of line side converters 13b. The stator windings of the plurality of wind generators 11b are electrically connected to the medium voltage side MV of the first boost device 21b. The rotor windings of the plurality of wind generators 11b are correspondingly electrically connected to the plurality of rotor side converters 12b in a one-to-one ratio; and each of the line side converters 13b is electrically connected to at least one rotor side converter 12b.

Since the rotor side converter has to deal with relatively larger reactive current, the capacity of the rotor side converter is generally at least 2 times that of the line side converter. That is to say, if the capacity of the line side converter is the same as that of the line side converter, a group of line side converters can be correspondingly connected to at least two groups of rotor side converters.

As shown in FIG. 3, two or more rotor side converters 12b are connected together at the DC side, and share a common line side converter 13b. One end of the common line side converter is connected to the DC bus and the other end is connected to the second boost device 31b. The medium voltage side of the second boost device 31b and the stator winding are connected to the common medium voltage point A. The rotor side converters and the line side converter shown in FIG. 3 are of the same design and the same capacity, thereby facilitating the modular design of the converter system.

The rotor side converter and the line side converter can be disposed separately at the DC bus side. For example, the rotor side converter and the wind generators are mounted together in the top of the tower, and the line side converter and the second boost device are arranged in the bottom of the tower. The rotor side converter and the line side converter are disposed in different positions of the tower, facilitating the layout optimization and heat dissipation design of the power generation system, and helping to realize a power generation system with higher power.

In this embodiment, each of the line side converters is correspondingly electrically connected to two rotor side converters, but the present invention is not limited thereto. In other embodiments, the number of the rotor side converters to which each line side converter corresponds can add or decrease according to the needs of the designer.

Further, referring to FIGS. 2 and 3 again, the second boost device 31$b$ has a low voltage side LV and a medium voltage side MV. The low voltage side LV of the second boost device 31$b$ is electrically connected to the line side converter 13$b$, and the medium voltage side MV of the second boost device 31$b$ is electrically connected to the medium voltage side MV of the first boost device 21$b$, namely the common medium voltage point A.

Figure 4:
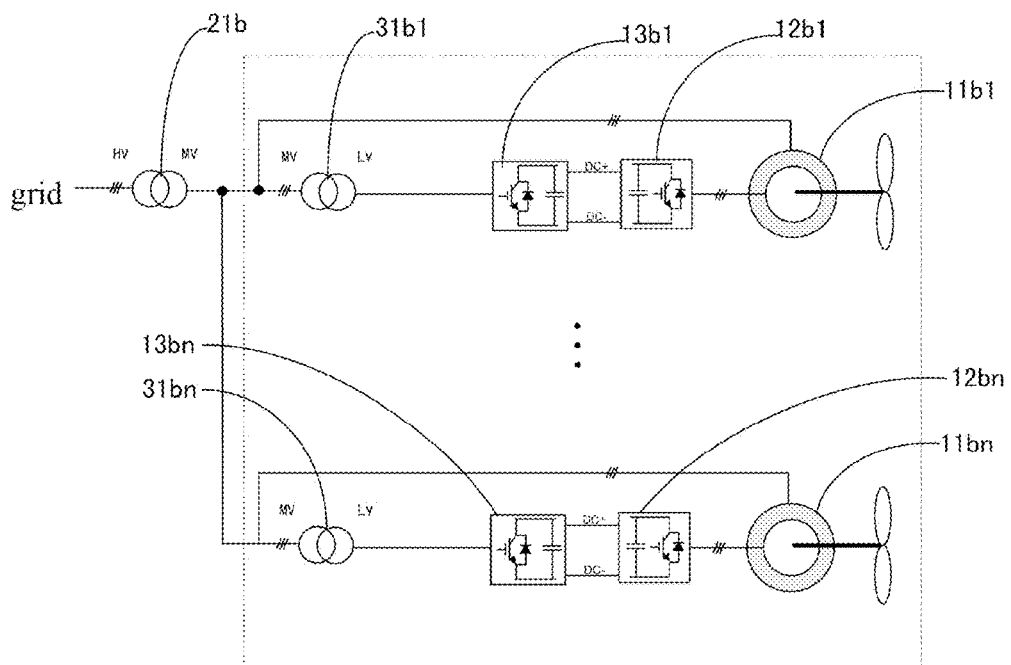
FIG. 4 is a schematic view showing the structure of the medium voltage wind power generation system according to the third embodiment of the present invention.

Refer to FIG. 4, which is a schematic view showing the structure of the medium voltage wind power generation system according to the third embodiment of the present invention. The medium voltage wind power generation system shown in FIG. 4 differs from that shown in FIG. 3 in that the medium voltage wind power generation system shown in FIG. 4 further comprises a plurality of second boost devices 31$b$1 to 31$bn$ and a plurality of line side converters 13$b$1 to 13$bn$. The medium voltage sides MV of the plurality of second boost devices 31$b$1 to 31$bn$ are electrically connected to the medium voltage side MV of the first boost device 21$b$. The low voltage sides LV of the plurality of second boost devices 31$b$1 to 31$bn$ are correspondingly electrically connected to the plurality of line side converters 13$b$1 to 13$bn$ in a one-to-one ratio. The plurality of line side converters 13$b$1 to 13$bn$ are correspondingly electrically connected to the plurality of rotor side converters 12$b$1 to 12$bn$ in a one-to-one ratio. The plurality of rotor side converters 12$b$1 to 12$bn$ are correspondingly electrically connected to the wind generators 11$b$1 to 11$bn$ in one-to-one ratio. Specifically, the first boost device and the plurality of second boost devices are all boosting transformers.

Figure 5:
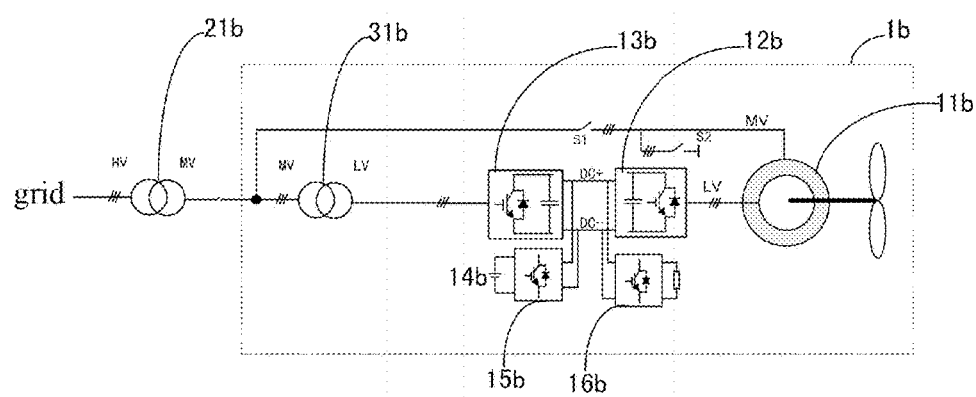
FIG. 5 is a schematic view showing the structure of the medium voltage wind power generation system according to the fourth embodiment of the present invention.

Refer to FIG. 5, which is a schematic view showing the structure of the medium voltage wind power generation system according to the fourth embodiment of the present invention. The medium voltage wind power generation system shown in FIG. 5 differs from that shown in FIG. 2 in that the medium voltage wind power generation system shown in FIG. 5 further comprises a first switch S1 and a second switch S2 disposed on the path for connecting the stator windings and the medium voltage side MV of the first boost device 21$b$. And the operating modes of the wind generator 11$b$ are adjusted by switching the first switch S1 and the second switch S2 through a control unit, so that the low speed operation range of the wind generator can be effectively broadened. When the first switch S1 is switched on and the second switch S2 is switched off, the wind generator 11$b$ is in a high-speed operation mode, and the operating speed is generally in a slip range between −0.3 and 0.3. When the first switch S1 is switched off and the second switch S2 is switched on, the wind generator 11$b$ is in a low-speed operation mode. The generator 11$b$ is in a mode of power generation by induction generator in which the stator is short circuit. Then the operating speed is no longer limited to slip voltage, and it operates in a slip range between 0.3 and 1.

Refer to FIG. 5 again. The doubly-fed wind power generation device 1$b$ of the medium voltage wind power generation system shown in FIG. 5 further comprises an energy storage element 14$b$, a bi-directional DC/DC charger 15$b$ and a chopper unit 16$b$. The energy storage element 14$b$ is electrically connected between the line side converter 13$b$ and the rotor side converter 12$b$ via the bi-directional DC/DC charger 15$b$. And the energy storage element 14$b$ and the bi-directional DC/DC charger 15$b$ are adapted for frequency adjusting and power smoothing of the wind power generation system. The chopper unit 16$b$ is electrically connected between the line side converter 13$b$ and the rotor side converter 12$b$ to achieve the fault protection function of the system, so that the voltage of the DC bus is maintained within a reliable operation range to protect the converter electronic devices from overvoltage. This embodiment involves the energy storage element 14$b$, the bi-directional DC/DC charger 15$b$ and the chopper unit 16$b$, but the present invention is not limited thereto. That is, other embodiments may involve only the energy storage element 14$b$ and the bi-directional DC/DC charger 15$b$, or only the chopper unit 16$b$.

Figure 6:
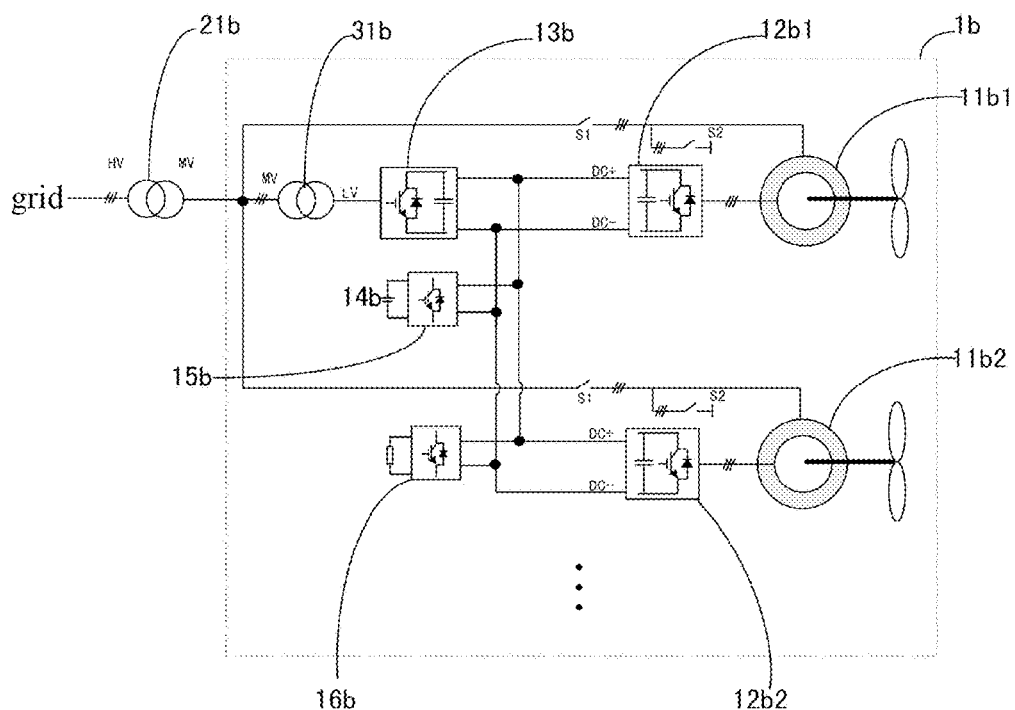
FIG. 6 is a schematic view showing the structure of the medium voltage wind power generation system according to the fifth embodiment of the present invention.

Refer to FIG. 6, which is a schematic view showing the structure of the medium voltage wind power generation system according to the fifth embodiment of the present invention. The medium voltage wind power generation system shown in FIG. 6 differs from that shown in FIG. 3 in that the path for connecting each stator winding and the medium voltage side MV of the first boost device 21$b$ is provided with a first switch S1 and a second switch S2. And the operating modes of each of the plurality of wind generators (11$b$1, 11$b$2 . . . ) are adjusted by correspondingly switching the first switch S1 and the second switch S2 through the control unit, so that the low speed operation range of the wind generators can be effectively broadened. When the first switches S1 are switched on and the second switches S2 are switched off, the wind generators are in a high-speed operation mode, and the operating speed is generally in a slip range between −0.3 and 0.3. When the first switches S1 are switched off and the second switches S2 are switched on, the wind generators are in a low-speed operation mode. The generators are in a mode of power generation by induction generators in which the stators are short circuit. Then the operating speed is no longer limited to slip voltage, and it operates in a slip range between 0.3 and 1. The operating modes of the plurality of wind generators (11$b$1, 11$b$2 . . . ) may be the same or different. For example, while the operating mode of the wind generator 11$b$1 is set to a high-speed mode, the operating mode of the wind generator 11$b$2 may be set to a low-speed mode.

Refer to FIG. 6 again. The doubly-fed wind power generation device 1$b$ of the medium voltage wind power generation system shown in FIG. 6 further comprises the energy storage element 14$b$, the bi-directional DC/DC charger 15$b$ and the chopper unit 16$b$. The energy storage element 14$b$ is electrically connected between the line side converter 13$b$ and the rotor side converter 12$b$1 via the bi-directional DC/DC charger 15$b$. And the energy storage element 14$b$ and the bi-directional DC/DC charger 15$b$ are adapted for frequency adjusting and power smoothing of the wind power generation system. The chopper unit 16$b$ is electrically connected between the line side converter 13$b$ and the rotor side converter 12$b$2 to achieve the fault protection function of the system, so that the voltage of the DC bus is maintained within a reliable operation range to protect the converter electronic devices from overvoltage. This embodiment involves the energy storage element 14$b$, the bi-directional DC/DC charger 15$b$ and the chopper unit 16$b$, but the present invention is not limited thereto. That is, other embodiments may involve only the energy storage element 14*b* and the bi-directional DC/DC charger 15*b*, or only the chopper unit 16*b*.

Figure 7:
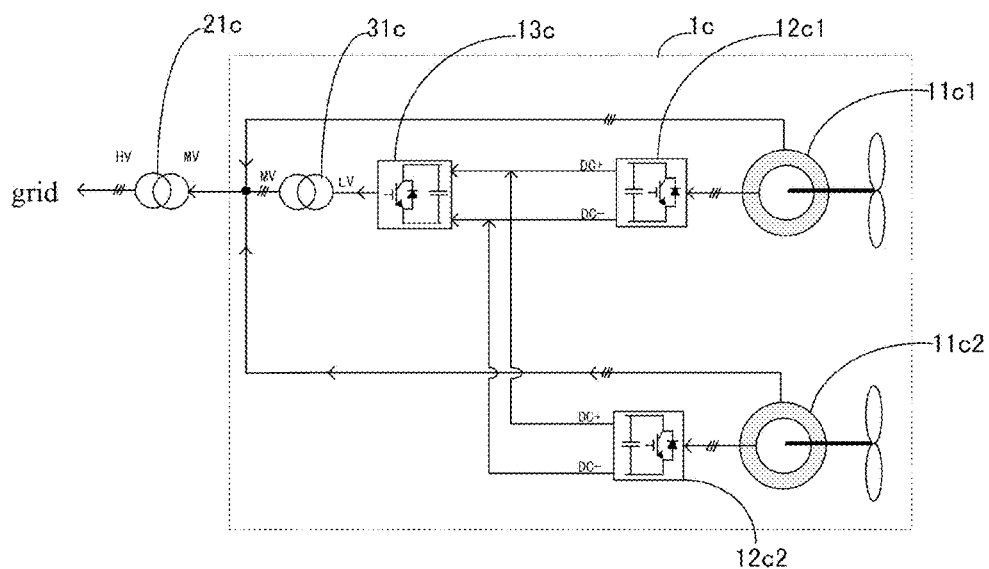
FIG. 7 is a schematic view showing the energy transmission of the super synchronous operation of the medium voltage wind power generation system according to the present invention.

Refer to FIG. 7, which is a schematic view showing the energy transmission of the super synchronous work of the medium voltage wind power generation system of the present invention. The connections among all the parts of the medium voltage wind power generation system shown in FIG. 7 is substantially the same as those in the medium voltage wind power generation system shown in FIG. 3. The direction of the arrows in FIG. 7 is the right direction in which energy is transmitted. The medium voltage alternating current comprises rotor medium voltage alternating current and stator medium voltage alternating current. The medium voltage wind power generation system shown in FIG. 7 comprises a first boost device 21*c* and a doubly-fed wind power generation device 1*c*. The first boost device 21*c* has a medium voltage side and a high voltage side, and the high voltage side of the first boost device 21*c* is electrically connected to a grid. The doubly-fed wind power generation device 1*c* is electrically connected to the medium voltage side MV of the first boost device 21*c*.

Further, the doubly-fed wind power generation device 1*c* comprises two wind generators 11*c*1 and 11*c*2, two rotor side converters 12*c*1 and 12*c*2, a line side converter 13*c* and a second boost device 31*c*. The stator windings of the two wind generators 11*c*1 and 11*c*2 are electrically connected to the medium voltage side MV of the first boost device 21*c*. The two rotor side converters 12*c*1 and 12*c*2 are coupled to the rotor windings of the two wind generators 11*c*1 and 11*c*2, respectively. The line side converter 13*c* is correspondingly coupled to the two rotor side converters 12*c*1 and 12*c*2. The stator windings of the two wind generators output stator medium voltage alternating current to the medium voltage side MV of the first boost device 21*c*. The low voltage alternating current outputted by the line side converter 13*c* is converted into rotor medium voltage alternating current via the second boost device 31*c*. The rotor medium voltage alternating current is outputted to the medium voltage side MV of the first boost device 21*c*. The first boost device 21*c* converts the stator medium voltage alternating current and the rotor medium voltage alternating current into high voltage alternating current. And the high voltage alternating current is transmitted to the grid via the high voltage side HV of the first boost device 21*c*. A structure which directly transmits medium voltage through stator windings is used for energy transmission. On the premise that the low voltage converter is not changed, medium voltage is transmitted by cables so as to greatly save the cost of cables (the higher the voltage transmitted by cables, the lower the cost). Meanwhile, a two-stage structure is used to increase transmission efficiency.

Figure 8:
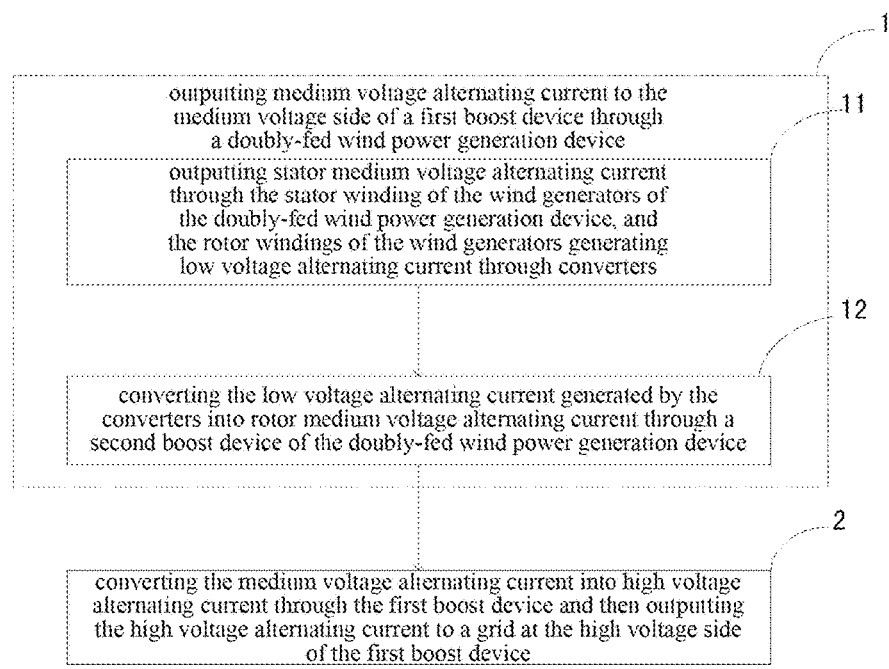
FIG. 8 is a flow diagram of the medium voltage wind power generation method according to the present invention.

Refer to FIG. 8, which is a flow diagram of the medium voltage wind power generation method according to the present invention. As shown in FIG. 8, the medium voltage wind power generation method according to the present invention comprises:

step 1: outputting medium voltage alternating current to the medium voltage side of a first boost device through a doubly-fed wind power generation device; and step 2: converting the medium voltage alternating current into high voltage alternating current through the first boost device and then outputting the high voltage alternating current to a grid at the high voltage side of the first boost device.

Further, said step 1 further comprises: outputting stator medium voltage alternating current through the stator winding of the wind generators of the doubly-fed wind power generation device, and the rotor windings of the wind generators generating low voltage alternating current through converters.

Furthermore, said step 1 further comprises: converting the low voltage alternating current generated by the converters into rotor medium voltage alternating current through a second boost device of the doubly-fed wind power generation device.

The above are only the preferred embodiments of the present invention, which are not used for limiting the scope of the present invention. Those skilled in the art can make all kinds of corresponding changes and modifications according to the present invention without departing from the spirit and essence of the present invention. It is intended that all these changes and modifications be covered by the appended claims of the present invention.

What is claimed is:

1. A medium voltage wind power generation system, comprising:
   a first boost device, which has a medium voltage side and a high voltage side, the high voltage side of the first boost device being electrically connected to a grid; and
   a doubly-fed wind power generation device, wherein the doubly-fed wind power generation device comprises:
   at least one wind generator, which comprises stator windings and rotor windings, the stator windings being coupled to the medium voltage side of the first boost device;
   at least one rotor side converter, which is coupled to the rotor windings; and
   at least one line side converter, one end of which is coupled to the rotor side converter, and the other end of which is coupled to the medium voltage side of the first boost device via a second boost device,
   wherein, the stator windings output medium voltage alternating current which is transmitted to the medium voltage side of the first boost device directly through a medium voltage cable.

2. The medium voltage wind power generation system according to claim 1, wherein the doubly-fed wind power generation device comprises:
   a plurality of wind generators, the stator windings of which are electrically connected to the medium voltage side of the first boost device;
   a plurality of rotor side converters, correspondingly electrically connected to the rotor windings of the plurality of wind generators; and
   at least one line side converter, each of which is electrically connected to at least one rotor side converter.

3. The medium voltage wind power generation system according to claim 2, wherein the doubly-fed wind power generation device comprises:
   a plurality of line side converters, each of which is correspondingly electrically connected to two rotor side converters.

4. The medium voltage wind power generation system according to claim 1, wherein the second boost device has a low voltage side and a medium voltage side, the low voltage side of the second boost device is electrically connected to the line side converter, and the medium voltage side of the second boost device is electrically connected to the medium voltage side of the first boost device.

5. The medium voltage wind power generation system according to claim 1, wherein a path for connecting the stator windings and the medium voltage side of the first boost device is provided with a first switch and a second switch, and the operating modes of the wind generator are adjusted by switching the first switch and the second switch.

6. The medium voltage wind power generation system according to claim 1, wherein the wind power generation device further comprises an energy storage element and a bi-directional DC/DC charger, and the energy storage element is electrically connected between the line side converter and the rotor side converter via the bi-directional DC/DC charger.

7. The medium voltage wind power generation system according to claim 1, wherein the wind power generation device further comprises a chopper unit, which is electrically connected between the line side converter and the rotor side converter.

8. A medium voltage wind power generation method, comprising:
   step 1: outputting medium voltage alternating current through stator windings of wind generators of a doubly-fed wind power generation device, said medium voltage alternating current being transmitted to a medium voltage side of a first boost device directly through a medium voltage cable; and
   step 2: converting the medium voltage alternating current into high voltage alternating current through the first boost device and outputting the high voltage alternating current to a grid at the high voltage side of the first boost device.

9. The medium voltage wind power generation method according to claim 8, wherein said step 1 further comprises step 1-1: rotor windings of the wind generators of the doubly-fed wind power generation device generates low voltage alternating current through converters.

10. The medium voltage wind power generation method according to claim 9, wherein said step 1 further comprises step 1-2: converting the low voltage alternating current generated by the converters into rotor medium voltage alternating current through a second boost device of the doubly-fed wind power generation device.

* * * * *